Patented Oct. 4, 1932

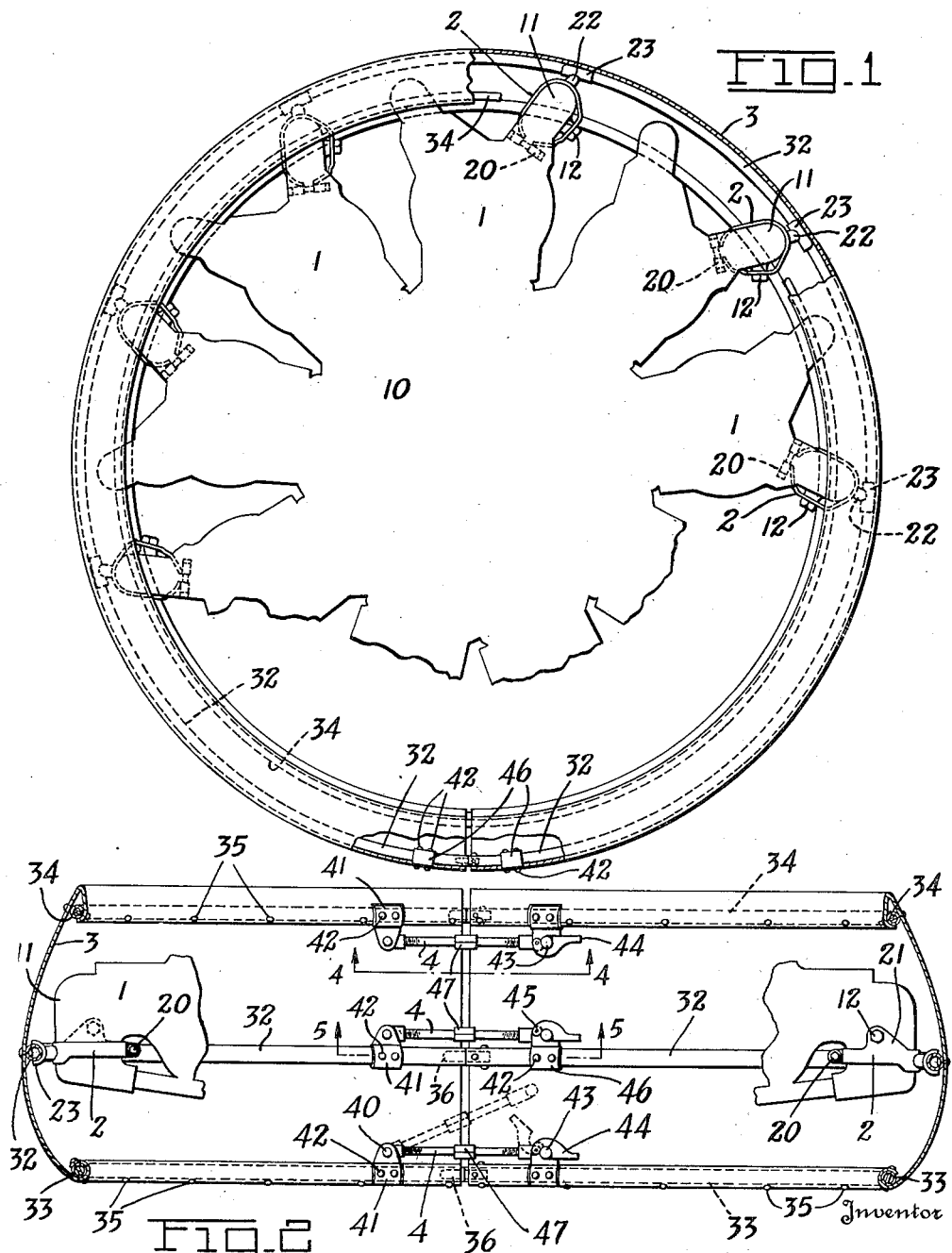

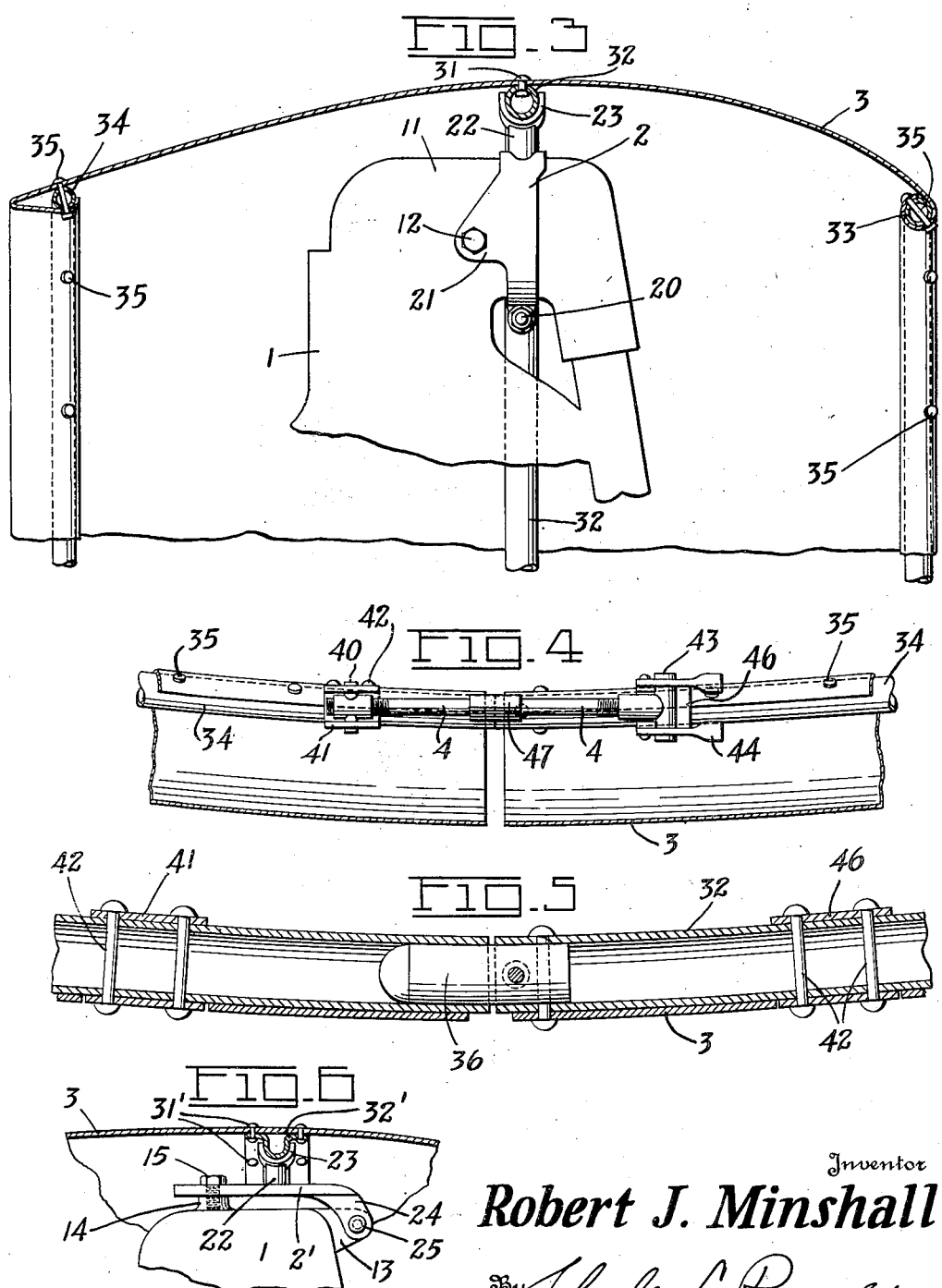

1,880,355

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON, A CORPORATION OF WASHINGTON

ONE PIECE RING COWL

Application filed February 24, 1931. Serial No. 517,823.

My invention relates to low-drag ring cowls for airplane engines, and has for its particular object the provision of a ring cowl of this type which may be made in one piece and which is therefore easily applied and removed, and to provide a support therefor, by means of which the ring cowl can be supported preferably upon the cylinders of the engine, and may be secured thereon securely, and yet in a simple manner, which permits easy removal.

It is a further object, in connection with a one-piece ring cowl, to provide means whereby the cowl will be, in a large measure, self-positioning, not requiring the registry of parts on the cowl with parts upon the engine or any support, and which may be tensioned alike throughout its circumference.

Other objects, more especially such as relate to the mechanical details of my invention, will be ascertained by a study of the accompanying drawings, of this specification and of the claims which terminate the same, in all of which my invention is disclosed in forms which are at present preferred by me.

Figure 1 is a front view of the ring cowl, the engine with which it is associated being diagrammatically illustrated, and parts of the cowl being broken away for convenience of illustration.

Figure 2 is a transverse section through the cowl, on a horizontal plane.

Figure 3 is a transverse section on an enlarged scale, through one side of the cowl, showing the manner in which it is supported upon a cylinder of the engine.

Figure 4 is a section on line 4—4 and Figure 5 a section on line 5—5 of Figure 2, showing details of the support of the cowl.

Figure 6 is a detail section illustrating a modified form of bracket.

Ring cowls have heretofore been made in sections, each section individually supported from the engine, and each section being secured to the ends of adjacent sections. When it became necessary to work upon the motor, it was necessary to take off the cowl, and the taking down and replacing of such a sectional cowl required considerable time. One-piece ring cowls have been proposed, but the manner of support of such cowls has made it necessary that devices spaced about and fixed to the inside of the cowl be brought into exact registry with complemental parts upon the several cylinders of the motor, and maintained thus. Hence, it was not possible to draw tight the cowl throughout its circumference, nor to hold it sufficiently securely to the engine.

An engine of a type in common use is illustrated in a diagrammatic way in Figure 1. Upon the crank casing 10 are supported radially disposed cylinders 1, each of which is provided with projecting parts, such, for instance, as the rocker arm housing 11, which corresponds to the exhaust valve or to the inlet valve, as the case may be.

These housings 11 offer a convenient means of supporting a bracket 2, which in effect, is formed of two arms which encircle the rocker arm housing 11, and are clamped together by a clamping bolt and nut 20 beneath the housing. To further secure the bracket in place, and to prevent its slipping about the housing 11, I may take advantage of the location of a bolt 12 upon the side of the housing, and provide the bracket with an ear 21, which is apertured to receive this bolt. The bolt, then, is taken out and passed through the aperture in the ear and again threaded into the housing 11, whereupon the bracket 2, which is clamped about the housing, is prevented from movement relative to the housing and cylinder.

At a position just inside of the ring cowl 3, I support a series of channels 23, which are disposed generally in a circle common to all of the other channels, supported upon the several cylinders, as may be seen in Figure 1. These channels face outwardly, and are held at proper distance from the rocker arm housing 11 by a neck such as 22, carried each by its bracket 2. These brackets typify a convenient means of supporting the channels from the engine, but not necessarily the only means.

Thus disposed, these channels may receive a hoop 32 which is secured to the cowl 3 between its leading and trailing edges, and extends circumferentially about its inner surface. The securing means may be the rivets 31, spaced at intervals about the hoop and cowl, or any other convenient means. It is important, however, that the hoop should be connected at intervals to the cowl, so as to support the same, and to offer a means whereby tension circumferentially of the cowl may be taken up by the hoop.

The cowl 3 is, of course, streamlined to enable it to perform its function of cutting down the resistance occasioned by the engine, and adding to the speed of the airplane, and yet assisting and improving the cooling of the motor. It may have hoops 33 and 34 disposed in its leading and trailing edges, respectively, similar to the hoop 32, but it is not necessary to provide means for supporting these latter hoops. Like the hoop 32, they would be secured at intervals to the cowl 3 by means such as the rivets 35.

The cowl itself, and the several hoops, are split, and in arranging the cowl upon the engine, the split is usually brought to the lowermost point, as may be seen in Figure 1. To insure alignment of the parts when the ring is placed in position, dowel pins 36 may be secured in one end of the hoop, as indicated in Figure 5, its projecting end being received in the other end of the same hoop.

To secure the cowl in place, and to retain the hoop 32 in the channels 23, it is necessary to draw the several parts tight about the engine, and to do this I provide suitable members extending across the split and comprising, for instance, the rod 4, received in a pivot pin at 40 upon a collar 41 encircling and secured to the hoop 32 by such means as the rivets 42. The swinging end of the rod 4 has a cross member, as for instance, a cross pin 43, which is engageable with a cam lever 44, the latter being pivoted at 45 upon a collar 46, encircling and secured to the opposite end of the hoop 32 in the same way as the collar 41. The lever 44 is of the type used in safety clamps, and has a transverse groove (see Figure 2), within which is received the cross pin 43. When the lever 44 is thrown to the right, as seen in Figure 2, it draws upon the rod 4 through the pin 43, and draws together and holds securely the two ends of the hoop and the split ring cowl. Means are provided for adjusting the length of the rod 4; for instance, its ends may be oppositely threaded and it may be provided with a non-circular portion at 47, whereby the ends may be turned in the two pins 40 and 43.

By the securing means described, it is possible to draw the ring cowl tight about the engine throughout its entire circumference. The channels 23 offer little or no restraint to movement of the hoop 32 in the direction of its length, that is, circumferentially, and thus by drawing tight at the split at the bottom, the hoop 32 is contracted all the way around the engine, and the tension is rendered substantially the same at all points.

Other models of engines may not be provided with the rocker arm housing as 11, or with means about which the bracket 2 may be clamped, and such an engine is shown in Figure 6. The top of the cylinder in such a motor would be provided with an ear 13 and with a boss 14 which is threaded. Such parts are designed for other purposes in such a motor, but the ear 13 may be employed to provide a support for an ear 24, through which ear and the ear 13 is passed a bolt 25, and the bolt 15, which commonly closes the threaded aperture and the boss 14, may be passed through an aperture provided in the bracket 2', by which means this bracket is held to the engine cylinder. The neck 22 and channel 23 are the same in the two forms, except as the length of the neck may be different, but the hoop 32' is shown slightly modified. In this form it takes a channel shape, and there is afforded the opportunity to use two securing rivets 31' in a given length, instead of one.

What I claim as my invention is:—

1. In combination with a split ring cowl adapted to be disposed about the radially projecting cylinders of an airplane motor, brackets adapted for securement to the cylinders, and each including an outwardly directed channel disposed in a circle common to the other channels, a split hoop secured to the inner side of the cowl, and received in said channels, and means to contract said hoop throughout its circumference, to grip the brackets and to retain the hoop in their channels.

2. In combination with a ring cowl for airplane engines, a split hoop extending about and secured to the inner side of said cowl, means for securing together the ends of the hoop, and means to support the same comprising a plurality of brackets fixed in position about the motor of an airplane, each including an outwardly directed channel lying in a circle common to the other channels and of a diameter substantially equal to the diameter of the hoop when closed.

3. The combination of claim 2, the hoop-securing means including means for positively drawing together the ends of the hoop, to draw the same tight in the channels throughout its length.

4. In combination with a split ring cowl adapted to encircle an airplane engine, a split hoop secured to the inner side of said cowl, means for drawing together the ends of the hoop and cowl, a plurality of brackets terminating in outwardly directed channels lying in a circle common to the other channels and of a diameter substantially that of the hoop when closed, and means to secure the several brackets each upon an engine cylinder.

5. The combination of claim 4, the hoop being disposed between the leading and trailing edges of the cowl, split hoops disposed in each edge of the cowl, and secured thereto, and means to retain the ends of the several hoops in registry when the ends of the hoops and cowl are drawn together.

6. The combination of claim 4, the hoop being disposed between the leading and trailing edges of the cowl, split hoops disposed in each edge of the cowl, and secured thereto, and dowel pins secured in one end of each hoop, and entering the opposite end, the means to draw together the ends of the hoop comprising a member secured to one end of each hoop, and a second member engageable thereby, and secured to the opposite end of the hoop.

7. The combination of claim 4, the means to draw together the ends of the hoop comprising a rod pivotally supported at one end from one end of the hoop, and terminating at its other end in a cross member, and a cam lever secured upon the opposite end of the hoop, and engageable with the cross member to draw it across the gap, and to hold it.

8. The combination of claim 4, the means to draw together the ends of the hoop comprising a rod pivotally supported at one end from one end of the hoop, and terminating at its other end in a cross member, and a cam lever secured upon the opposite end of the hoop, and engageable with the cross member to draw it across the gap, and to hold it and means to vary the length of said rod.

9. In combination with the motor of an airplane, including cylinders radially disposed, each cylinder having a rocker arm housing extending forwardly, a ring cowl including a hoop secured upon its inner side, extending about said motor, a plurality of brackets each comprising arms encircling the rocker arm housing, means to clamp said arms about said housing, and an outwardly directed and circumferentially extending channel adapted to receive said hoop to support the ring cowl.

10. The combination of claim 9, and means to positively secure the bracket against movement relative to the rocker arm housing.

11. The combination of claim 9, the brackets each having an apertured ear, and a bolt passing through said ear and received in the cylinder, to secure the bracket against movement relative thereto.

12. In combination with a ring cowl for airplane engines, a plurality of supporting means therefor disposed circularly about the engine, means upon the ring cowl to engage with said supporting means to prevent axial movement of the ring cowl relative thereto, but to permit its circumferential movement, and means to secure the cowl upon said supporting means against radial movement.

13. In combination with a ring cowl for airplane engines, a plurality of supporting means therefor disposed circularly about the engine, means upon the ring cowl to engage with said supporting means to prevent axial movement of the ring cowl relative thereto, but to permit its circumferential movement, and means to contract said cowl circumferentially to secure it with relation to said supporting means against radial movement.

Signed at Seattle, King County, Washington, this 19th day of February, 1931.

ROBERT J. MINSHALL.